(12) United States Patent
Ookawa et al.

(10) Patent No.: US 9,653,201 B2
(45) Date of Patent: May 16, 2017

(54) CONTACTLESS FEED SYSTEM AND SHIELD CASE FOR THE SAME

(71) Applicants: Yazaki Corporation, Minato-ku, Tokyo (JP); TOYOTA JIDOSHA KABUSHIKI KAISHA, Toyota-shi, Aichi (JP)

(72) Inventors: Masamitsu Ookawa, Susono (JP); Noritaka Taguchi, Susono (JP); Kazuyoshi Kagami, Susono (JP); Shinji Ichikawa, Toyota (JP); Satoru Horiuchi, Toyota (JP)

(73) Assignees: Yazaki Corporation, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 392 days.

(21) Appl. No.: 14/465,226

(22) Filed: Aug. 21, 2014

(65) Prior Publication Data

US 2014/0361635 A1    Dec. 11, 2014

Related U.S. Application Data

(63) Continuation of application No. PCT/JP2013/054111, filed on Feb. 20, 2013.

(30) Foreign Application Priority Data

Feb. 23, 2012 (JP) .................................. 2012-036948

(51) Int. Cl.
*H01F 27/02* (2006.01)
*H01F 27/40* (2006.01)
(Continued)

(52) U.S. Cl.
CPC .............. *H01F 27/02* (2013.01); *B60L 11/18* (2013.01); *H01F 27/36* (2013.01); *H01F 27/40* (2013.01);
(Continued)

(58) Field of Classification Search
CPC . H02J 5/00; H02J 5/005; H02J 17/025; H01F 38/14
(Continued)

(56) References Cited

U.S. PATENT DOCUMENTS

2010/0156346 A1    6/2010  Takada et al.
2011/0241613 A1   10/2011  Ryu et al.
(Continued)

FOREIGN PATENT DOCUMENTS

CN    102177042 A    9/2011
CN    103975400 A    8/2014
(Continued)

OTHER PUBLICATIONS

Communication dated Oct. 28, 2015 from the European Patent Office issued in corresponding Application No. 13752137.3.
(Continued)

*Primary Examiner* — Jared Fureman
*Assistant Examiner* — Fan He
(74) *Attorney, Agent, or Firm* — Sughrue Mion, PLLC

(57) ABSTRACT

There is provided a shield case allowing efficient power delivery while ensuring environmental resistant such as strength and waterproof and provided a contactless feed system using the shield case.

A contactless feed system includes: a feed-side device installed in a fixed body; a receive-side device installed in a mobile body and fed electric power from the feed-side device in a contactless manner, and a shield case used in the feed-side device of the contactless feed system includes: a (Continued)

case open toward the receive-side device; a coil housed in an interior of the case; and a cover covering an opening of the case, wherein a load support member extending from a bottom surface of the case to an inner surface of the cover is provided inside the case.

12 Claims, 6 Drawing Sheets

(51) Int. Cl.
*H02J 5/00* (2016.01)
*H01F 38/14* (2006.01)
*H01F 27/36* (2006.01)
*H02J 17/00* (2006.01)
*B60L 11/18* (2006.01)
*H02J 7/00* (2006.01)
*H02J 7/02* (2016.01)
*H02J 50/10* (2016.01)
*H02J 50/12* (2016.01)

(52) U.S. Cl.
CPC ............... *H01F 38/14* (2013.01); *H02J 5/005* (2013.01); *H02J 7/0044* (2013.01); *H02J 7/025* (2013.01); *H02J 17/00* (2013.01); *H02J 50/10* (2016.02); *H02J 50/12* (2016.02)

(58) Field of Classification Search
USPC ...................................................... 336/84, 90
See application file for complete search history.

(56) References Cited

U.S. PATENT DOCUMENTS

| 2011/0254378 A1* | 10/2011 | Ichikawa | ............... B60L 5/005 307/104 |
| 2013/0037365 A1 | 2/2013 | Ichikawa | |
| 2015/0001957 A1* | 1/2015 | Ichikawa | ............... B60L 11/182 307/104 |

FOREIGN PATENT DOCUMENTS

| EP | 2671749 A1 | 12/2013 |
| EP | 2725592 A1 | 4/2014 |
| EP | 2763149 A1 | 8/2014 |
| EP | 2765584 A1 | 8/2014 |
| JP | 2010-093180 A | 4/2010 |
| JP | 2010-154625 A | 7/2010 |
| JP | 2010-268660 A | 11/2010 |
| JP | 2011-193671 A | 9/2011 |
| JP | 2011-204836 A | 10/2011 |
| JP | 2012-222956 A | 11/2012 |
| WO | 2010/041321 A1 | 4/2010 |
| WO | 2011/117714 A2 | 9/2011 |
| WO | 2012/157114 A1 | 11/2012 |

OTHER PUBLICATIONS

Communication dated Nov. 24, 2015 from the Intellectual Property Office of the P.R. China issued in corresponding Application No. 201380010633.4.

International Search Report of PCT/JP2013/054111 dated May 28, 2013.

* cited by examiner

CONTACTLESS FEED SYSTEM AND SHIELD CASE FOR THE SAME

TECHNICAL FIELD

The present invention relates to a contactless feed system and a shield case for the contactless feed system.

BACKGROUND ART

FIG. 8 is an entire configuration diagram of a conventional contactless feed system. In FIG. 8, the contactless feed system includes: an electric vehicle 100; and a feed device (contactless electric power supply device) 200. The electric vehicle 100 includes: a contactless electric power receiving device 101; a power control unit (hereinafter also referred to as PCU) 160; a motor 170; and an on-vehicle ECU (Electric Control Unit) 145. The contactless electric power receiving device 101 includes: a coil unit 180; a rectifier 130; a DC/DC converter 140; an electric storage device 150; and an electric apparatus 400 installed in an electromagnetic shield case 190.

FIG. 9 is a schematic diagram showing the electromagnetic shield cases 190, 250 shown in FIG. 8 and a peripheral structure thereof. As shown in FIG. 9, a coil case 191 is arranged in the electromagnetic shield case 190. A secondary self-resonant coil 110 and a secondary coil 120 shown in FIG. 8 are housed in the coil case 191. An opening 195 is provided on a bottom surface of the electromagnetic shield case 190. An electromagnetic shield material is stuck on the electromagnetic shield case 190, and a low impedance substance such as a slim copper foil is used as the electromagnetic shield material.

The electromagnetic shield case 190 prevents an electromagnetic field generated by the secondary self-resonant coil 110 and a primary self-resonant coil 240 from leaking toward a vehicle side.

A coil case 291 is arranged in the electromagnetic shield case 250. A primary self-resonant coil 240 and a primary coil 230 shown in FIG. 8 are housed in the coil case 291. An opening 255 is provided on a top surface of the electromagnetic shield case 250. The electromagnetic shield material is also stuck on the electromagnetic shield case 250.

FIG. 10 is a perspective view of the coil case 191. As shown in FIG. 10, the coil case 191 includes: a pan 193 formed in a bottomed cylindrical shape; and a top plate 192 arranged up on the pan 193. The top plate 192 is, for example, fixed to a lower surface of a floor panel of a vehicle. Further, the coil case 191 is projected downward from the lower surface of the floor panel.

FIG. 11 is an exploded perspective view of the coil case 191 shown in FIG. 10. As shown in FIG. 11, a bobbin 196 is arranged in the pan 193 formed in the bottomed cylindrical shape. The bobbin 196 is formed in a cylindrical shape, and a plurality of plates 197 is attached in a circumferential direction with intervals therebetween on an outer periphery of the bobbin 196. The secondary self-resonant coil 110 is supported by the plates 197. Incidentally, for example, six to eight plates are provided at equal intervals.

The coil unit 180 includes: the secondary self-resonant coil 110; the plates 197 supporting the secondary self-resonant coil 110; and the bobbin 196 as a support member for supporting the plates 197. The plates 197 are made of resin.

CITATION LIST

Patent Literature

[PTL1]
JP, A, 2010-093180

SUMMARY OF INVENTION

Technical Problem

According to the above prior art, in a method of supporting the shield case and the coil in the case, it is not considered that the shield case and the coil support member receive a load from an upper side of the case. The coil case is only aimed for shielding the electromagnetic field, and the coil support member is only aimed for supporting from the bottom of the case to the coil hold position.

Therefore, there is a fear that a case or a cover may be deformed and components disposed therein may be damaged when this case with the above structure is placed on a floor, and a load is applied from above to the case being thinner in a vertical direction. Further, there is a fear that a waterproof performance of the case may be reduced in association with deformations of the cover and the case due to a shortage of strength of the entire case.

Accordingly, an object of the present invention is to provide a shield case allowing efficient power delivery while ensuring environmental resistant such as strength and waterproof and to provide a contactless feed system using the shield case.

Solution to Problem

For solving the above problems, according to a first aspect of the present invention, there is provided a shield case used in a feed-side device of a contactless feed system, said contactless feed system including: the feed-side device installed in a fixed body; a receive-side device installed in a mobile body and fed electric power from the feed-side device in a contactless manner, said shield case including:
a case open toward the receive-side device;
a coil housed in an interior of the case; and
a cover covering an opening of the case,
wherein a load support member extending from a bottom surface of the case to an inner surface of the cover is provided inside the case.

According to the above, when the load is applied from above the cover, the load support member supports the cover. Thereby, the load bearing property of the shield case is improved, and a deformation of the cover, a contact with components housed inside, and damages thereby are prevented. Further, the waterproof performance is maintained. Therefore, the efficient power delivery can be done while ensuring environmental resistant such as strength and waterproof.

According to a second aspect of the present invention, there is provided the shield case used in the contactless feed system as described in the first aspect, further including:
a coil hold member for holding the coil in the case,
wherein the load support member is composed of the coil hold member.

According to the above, the coil hold member for holding the coil housed in the shield case also works as the load support member for receiving the load applied from above the cover. Thereby, because a member solely used for supporting the load is not provided, it is possible to ensure the certain load bearing property without notably increasing the total weight.

According to a third aspect of the present invention, there is provided the shield case used in the contactless feed system as described in the second aspect, wherein the coil is formed in a polygonal shape, and wherein the coil support member includes a coil support groove for supporting a straight portion of the polygonal shape of the coil.

According to the above, because the coil support groove for supporting the coil is straight, the groove forming process becomes easy and an increase of processing cost is prevented.

According to a fourth aspect of the present invention, there is provided the shield case used in the contactless feed system as described in any one of the first to third aspects, further including:

a capacitor connected to an end of the coil; and a capacitor protective member arranged around the capacitor, wherein the load support member is composed of the capacitor protective member.

According to the above, the capacitor protective member for protecting the capacitor housed in the shield case also works as the load support member for receiving the load applied from above the cover. Thereby, because a member solely used for supporting the load is not provided, it is possible to ensure the certain load bearing property without notably increasing the total weight.

According to a fifth aspect of the present invention, there is provided the shield case used in the contactless feed system as described in the fourth aspect, wherein the capacitor protective member is formed in a horseshoe shape.

According to the above, the capacitor housed in the shield case is protected by the capacitor protective member formed in a horseshoe shape surrounding the capacitor, and a fear such as breakage accident is reduced.

According to a sixth aspect of the present invention, there is provided the shield case used in the contactless feed system as described in the first aspect, wherein the case includes: a bottom plate; a shield member formed in a ring shape and having a bottom wall portion, a sidewall extending vertically from a peripheral edge of the bottom surface portion, and a top wall folded inward in a radial direction from an upper end of the sidewall portion; and a support member fitted into a concave of which three sides are surrounded by the bottom surface portion, the sidewall portion, and the top surface portion, and wherein the load support member is composed of the shield member and the support member.

According to the above, the shield member and the support member receive the load applied from above the cover, and work as the load support member to prevent the shield case from being deformed or crushed.

According to a seventh aspect of the present invention, there is provided the shield case used in the contactless feed system as described in the sixth aspect, wherein the cover is fixed to the case by a screw penetrating the top surface portion and screwed with the support member.

According to the above, the cover is screwed to the support member with a screw, the load bearing property bearing the load applied from above the cover is ensured in the whole shield case.

According to an eighth aspect of the present invention, there is provided a contactless feed system comprising:

a feed-side device installed in a fixed body;

a receive-side device installed in a mobile body and fed electric power from the feed-side device in a contactless manner, wherein the shield case used in the contactless feed system as described in any one of the first to seventh aspects is employed as the feed-side device.

According to the above, because the shield case used in the contactless feed system according to the present invention is employed as the feed-side device, efficient power delivery is allowed while ensuring environmental resistant such as strength and waterproof of the feed-side device.

Advantageous Effects of Invention

According to the shield case used in the contactless feed system as described in the first aspect, because the load support member extending from a bottom surface of the case to an inner surface of the cover is provided inside the case, the load support member can support the cover to prevent the cover from being deformed, and the load bearing property is improved, the waterproof performance is ensured. Further, because the load support member is provided, power feed efficiency is ensured without improving the strength and the rigidity of the cover by increasing a thickness of the cover.

According to the shield case used in the contactless feed system as described in the second aspect, because the coil hold member supports the cover, the coil hold member can double as a coil hold and a cover support, and the load bearing property of the shield case is ensured.

According to the shield case used in the contactless feed system as described in the third aspect, because the coil is formed in a polygonal shape, and the coil support groove supports a straight portion of the polygonal shape of the coil, the groove can be processed linearly, thereby the process becomes easy, and an increase of processing cost is prevented.

According to the shield case used in the contactless feed system as described in the fourth aspect, because the shield case further includes: a capacitor connected to an end of the coil; and a capacitor protective member arranged around the capacitor, and the capacitor protective member supports the cover as the load support member, the capacitor protective member can double as a capacitor protection and as a cover support, the load bearing property of the shield case is ensured.

According to the shield case used in the contactless feed system as described in the fifth aspect, because the capacitor protective member is formed in a horseshoe shape, the capacitor protective member formed in the horseshoe shape surrounds the capacitor housed in the shield case to protect the capacitor, and a fear such as breakage accident is reduced.

According to the shield case used in the contactless feed system as described in the sixth aspect, the case includes: a bottom plate; a shield member formed in a ring shape and having a bottom surface portion, a sidewall portion extending vertically from a peripheral edge of the bottom surface portion, and a top surface portion folded inward in a radial direction from an upper end of the sidewall portion; and a support member fitted into a concave of which three sides are surrounded by the bottom surface portion, the sidewall portion, and the top surface portion, and the load support member is composed of the shield member and the support member. Therefore, the shield member and the support member receive the load applied from above the cover, and work as the load support member to prevent the shield case from being deformed or crushed.

According to the shield case used in the contactless feed system as described in the seventh aspect, because the cover is fixed to the case by a screw penetrating the top surface portion and screwed with the support member, the cover is easy to be screwed and hard to be released.

According to the contactless feed system as described in the eighth aspect, the contactless feed system includes: a feed-side device installed in a fixed body; a receive-side device installed in a mobile body and fed electric power from the feed-side device in a contactless manner, and the shield case used in the contactless feed system as described in any one of the first to seventh aspects is employed as the feed-side device. Therefore, efficient power delivery is allowed while ensuring environmental resistant such as strength and waterproof of the feed-side device.

DESCRIPTION OF EMBODIMENTS

Figure 1:
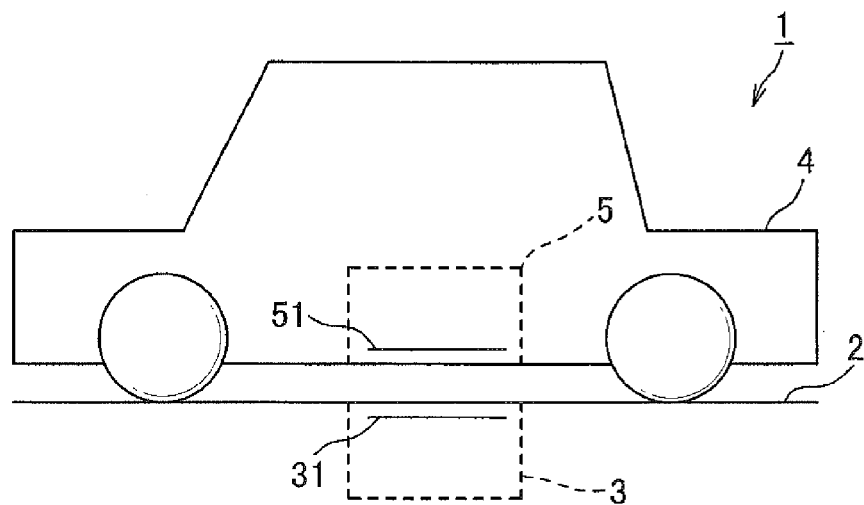
FIG. 1 is a schematic view showing a feed system of the present invention.
Figure 2:
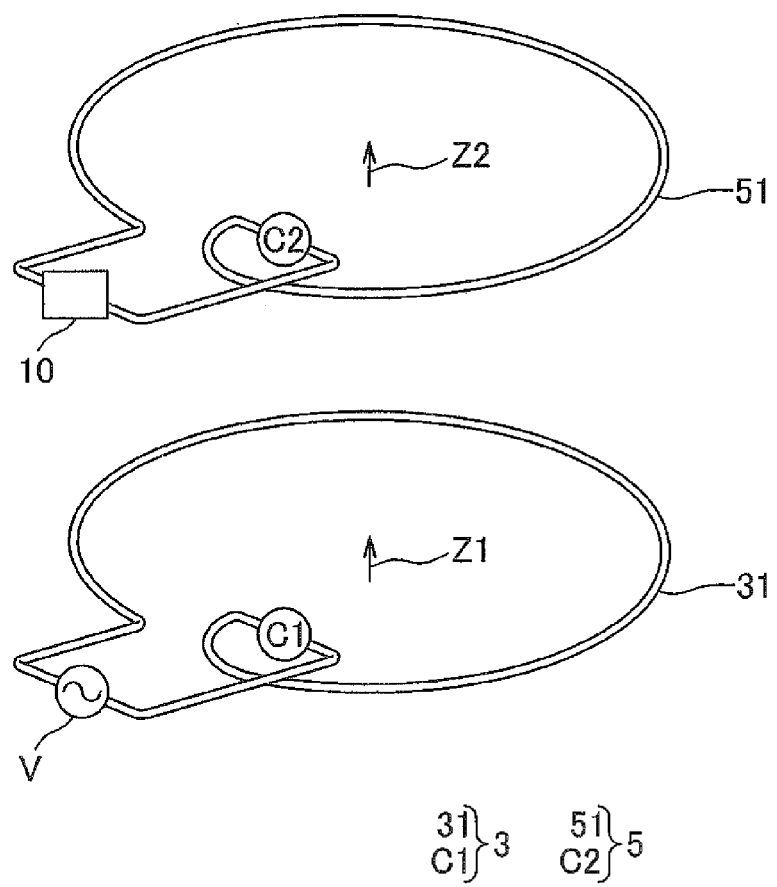
FIG. 2 is a schematic perspective view showing a feed-side resonance coil and a receive-side resonance coil composing the feed system shown in FIG. 1.

FIG. 1 is a schematic view showing a feed system of the present invention. FIG. 2 is a schematic perspective view showing a feed-side resonance coil and a receive-side resonance coil composing the feed system shown in FIG. 1.

A feed system 1 is a resonance type contactless feed system and provided with a feed portion 3 as a feed-side device provided on a car parking space 2 as a fixed body, and a receive portion 5 as a receive-side device provided on a belly portion or the like of a vehicle 4 as a mobile body. The feed portion 3 is provided with a feed-side resonance coil 31 to which AC power is supplied, and a capacitor C1 (FIG. 2) connected to both ends of the feed-side resonance coil 31.

The feed-side resonance coil 31 is made by winding a conductive wire in a loop shape, and arranged in a manner that a center axis Z1 is aligned with a direction from the car parking space 2 to the belly portion of the vehicle 4, namely, a vertical direction. The AC power source is connected to both ends of the feed-side resonance coil 31, and supplies AC power to the feed-side resonance coil 31.

For example, the feed-side resonance coil 31 is made by winding the conductive wire in a circular helical shape. In an embodiment shown in FIGS. 1 and 2, the number of winding of the feed-side resonance coil 31 is one. However, the present invention is not limited to this. As shown in FIG. 2, a capacitor C1 for adjusting a resonance frequency is connected to both ends of the feed-side resonance coil 31.

The receive portion 5 is provided with a receive-side resonance coil 51 which electromagnetically resonates when disposed separately from and opposite to the feed-side resonance coil 31 in the center axis direction thereof, and a capacitor C2 connected to both ends of the receive-side resonance coil 51.

The receive-side resonance coil 51 is made by winding a conductive wire in a loop shape, and arranged in a manner that a center axis Z2 is aligned with a direction from the belly portion of the vehicle 4 to the car parking space 2, namely, a vertical direction. A load 10 such as on-vehicle battery is connected to both ends of the receive-side resonance coil 51.

For example, the receive-side resonance coil 51 is made by winding the conductive wire in a circular helical shape. In an embodiment shown in FIGS. 1 and 2, the number N of winding of the receive-side resonance coil 51 is the same as the feed-side resonance coil 31 and one. However, the present invention is not limited to this. For example, a diameter of the receive-side resonance coil 51 may be smaller than a diameter of the above feed-side resonance coil 31.

As shown in FIG. 2, a capacitor C2 for adjusting a resonance frequency is connected to both ends of the receive-side resonance coil 51. These capacitors C1, C2 are provided for adjusting the resonance frequency, and each capacity of the feed-side and receive-side resonance coils 31, 51 is set to the capacity Cs where the resonance frequency is a desired frequency f0.

According to the above feed system 1, when the receive portion 5 of the vehicle 4 is moved close to the feed portion 3, and the feed-side resonance coil 31 and the receive-side resonance coil 51 are opposite to each other with a gap in the center axis direction, the feed-side resonance coil 31 and the receive-side resonance coil 51 are electromagnetically resonant to supply electric power from the feed portion 3 to the receive portion 5 in a contactless manner.

In more detail, when an AC current is supplied to the feed-side resonance coil 31, its electric power is sent wirelessly to the receive-side resonance coil 51 by magnetic field resonance. Further, when the electric power is sent to the receive-side resonance coil 51, this electric power is supplied to the load 10 connected to the receive-side resonance coil 51.

Though the feed portion 3 and the receive portion 5 are configured as above, in reality, the feed-side and receive-side resonance coils are respectively housed in an electromagnetic shield case, and covered by a non-metallic cover for allowing contactless power transmission as a shield case structure. In this embodiment, to supply electric power to an electric vehicle is assumed.

Figure 3:
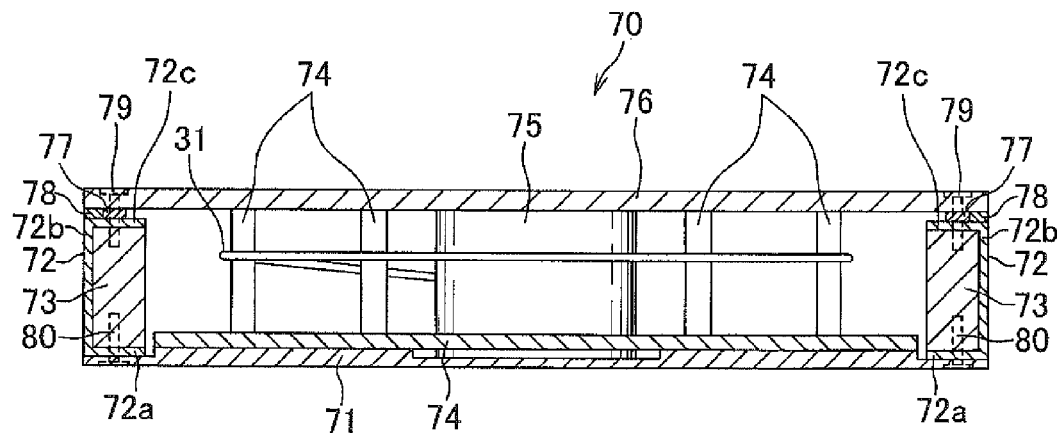
FIG. 3 is a schematic sectional view showing an embodiment of a shield case used in a contactless feed system according to the present invention.
Figure 4:
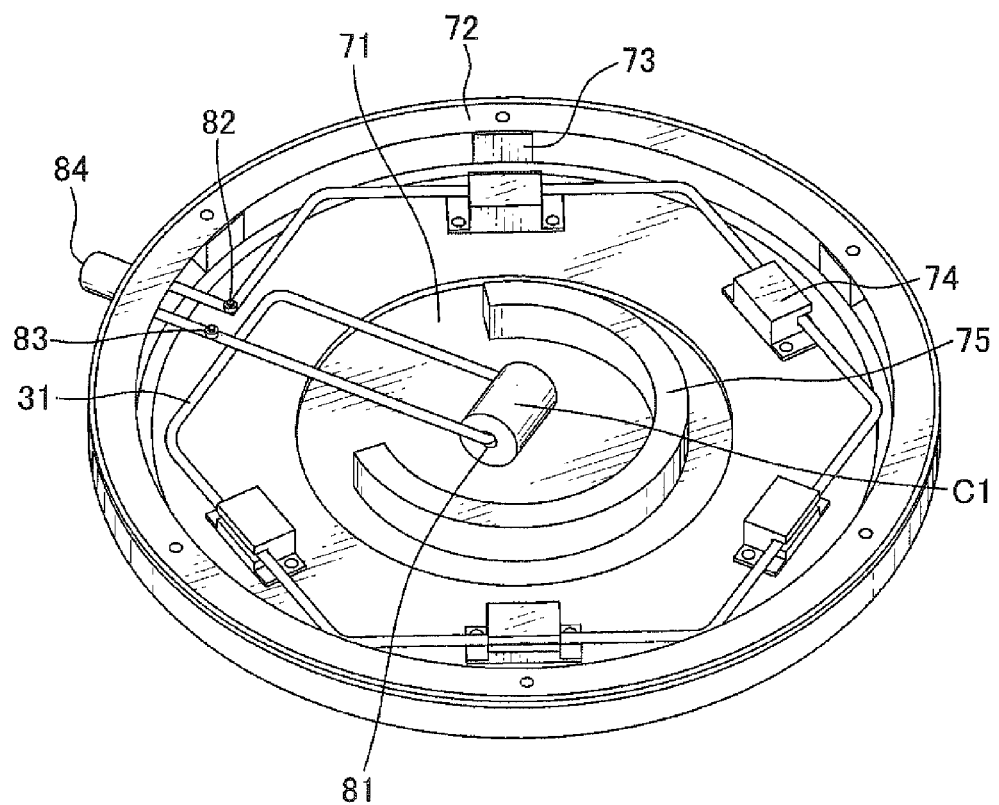
FIG. 4 is a perspective view showing the shield case of FIG. 1 in which a cover is omitted.

FIG. 3 is a schematic sectional view showing an embodiment of a shield case used in a contactless feed system (hereinafter, simply referred to as shield case) according to the present invention. FIG. 4 is a perspective view showing the shield case of FIG. 1 in which a cover is omitted. Incidentally, though FIG. 3 is a schematic sectional view, for improving visibility, some components are shown in a perspective manner.

In this embodiment, the shield case is not buried in but installed on a ground, and can be moved freely (floor placing type). Preferably, the infrastructure side (ground side, feed side) device is as thin as possible for adapting to any kind of electric vehicle. This device should satisfy conditions such as strength not to be destroyed when a vehicle moves on, waterproof property for outdoor use, and weight allowing a man to carry this device.

In this way, for solving this problem, the present invention provides a shield case allowing efficient power delivery while ensuring environmental resistant such as strength and waterproof in spite of a thin type by improving a shape of the shield case, and a way to support a cover.

In FIG. 3, a shield case 70 of the present invention is composed of a bottom plate 71, a shield member 72, a support member 73, a coil hold member 74 for holding the feed-side resonance coil 31, a capacitor protective member 75 for protecting the capacitor C1, and a cover 76. The shield case 70 is used in the feed portion 3 shown in FIG. 1.

The feed-side resonance coil 31 has, for example, a hexagonal shape made of an elongated metal rod (for example, copper rod). The number of winding of the feed-side resonance coil 31 is one. Both ends of the feed-side resonance coil 31 are electrically connected to a lead-out terminal 82 and one terminal of the capacitor C1 respectively, and connected to a connector 84 disposed outside of the shield case 70 via the lead-out terminal 82 and a lead-out terminal 83 connected to the other end of the capacitor C1 through lead wires.

The bottom plate 71 is made of metal or resin, and formed in a disk shape. The shield member 72 is made of metal, and formed in a ring shape having a U-shaped cross section including a concave portion 72a. Namely, the shield member 72 includes: a bottom wall 72a; a sidewall 72b extended vertically from a peripheral edge of the bottom wall 72a: and a top wall 72c folded inward in a radial direction from an upper end of the sidewall 72b. The shield member 72 is fastened around an outer periphery of the bottom plate 71 with a screw 80. The bottom plate 71 and the shield member 72 compose a case opened toward a position of the feed portion 3.

The support member 73 is made of hard resin, and formed in a rectangular parallelepiped shape. The support member 73 is fitted with a gap into the concave portion 72a having a substantially U-shaped cross section whose three sides are surrounded by the bottom wall 72a, sidewall 72b, and the top wall 72c. In this embodiment, six support members 73 are fitted at a regular interval, however, the number is not limited to the six, and the material is not limited to resin but may be metal, and the shape is not limited to a block shape, but may be in a plate shape. The coil hold member 74 is made of hard resin, and composed of a disk-shaped base 74a fixed to the bottom plate 71 with a screw or the like, and a plurality of square-pole shaped holders 74b extended vertically on the base 74a and each having a coil hold groove 74b1. A plurality of holders 74b is extended vertically on the base 74a. The capacitor protective member 75 is made of hard resin, and fixed to around the center of the bottom plate 71 with a screw or the like. The cover 76 is made of hard resin, formed in a disk shape, and fastened to the support member 73 with a screw 79 via a waterproof rubber 77 and the top wall 72c of the shield member 72.

Figure 5:
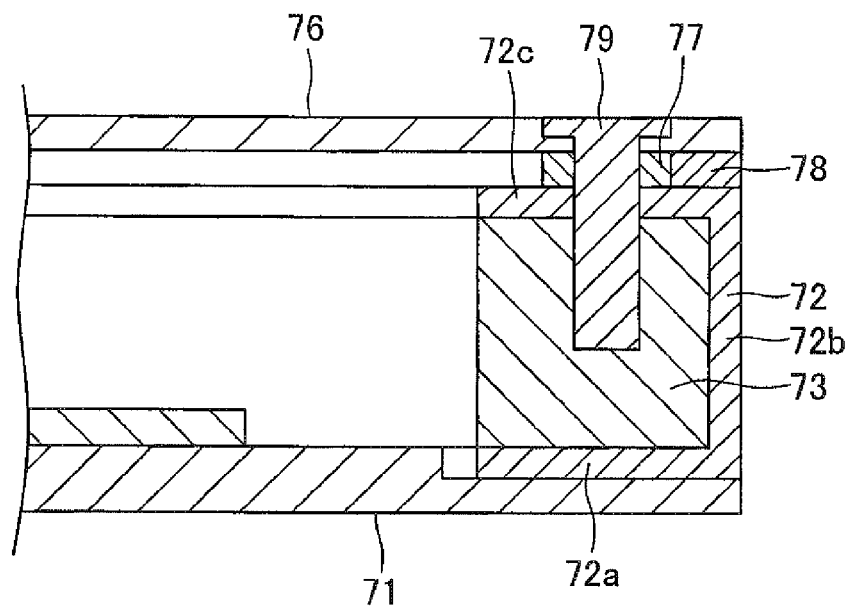
FIG. 5 is an enlarged partially sectional view showing the shield case used in the contactless feed system according to the present invention.

FIG. 5 is an enlarged partially sectional view showing the shield case 70. In FIG. 5, a fixation structure of the cover 76 is shown. Namely, the cover 76 covers an opening of the case composed of the bottom plate 71 and the shield member 72 when the cover 76 is fixed by the screw 79 penetrating the waterproof rubber 77 and the top wall 72c of the shield member 72 and screwed inside the support member 73. A ring-shaped spacer 78 is provided on the top wall 72c around an outer periphery of the shield member 72 to prevent the waterproof rubber from being deformed seriously and losing waterproof property when the screw 79 is screwed.

In this embodiment, the lengths of the bottom wall 72a and the upper wall 72c of the shield member 72 composing the concave portion 72a having a U-shaped cross section are the same, however, not necessarily the same. Such a shape of the shield member 72 can be made by welding metal. The shield member 72 works as a load support member together with the support member 73 so as to prevent the shield case 70 from being deformed or broken when the shield case 70 receives the load from above (above the cover 76). When the shield member 72 has a U-shaped cross section, and the support member 73 is fitted into the concave portion 72a, a certain load bearing property can be secured without increasing the thickness of the metal plate seriously, namely, without increasing the total weight notably. Thereby, the shield member 72 can be slim.

Figure 6A:
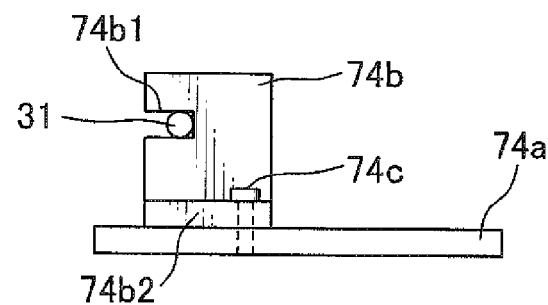
FIG. 6A is a side view showing a coil hold member of the shield case used in the contactless feed system according to the present invention.
Figure 6B:
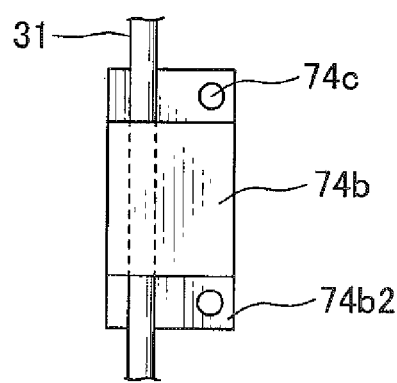
FIG. 6B is a plan view showing the coil hold member of the shield case used in the contactless feed system according to the present invention.

FIGS. 6A and 6B show a structure of the coil hold member 74. The holder 74b is integrally formed with a fixation portion 74b2 extended below the holder 74b2, and elected and fixed on the base 74a by a screw 74c screwed into a screw hole provided in the fixation portion 74b2. The coil hold groove 74b1 is formed in a direction perpendicular to a longitudinal direction of the square-pole shaped holder 74b in the middle of the longitudinal direction, and feed-side resonance coil 31 is inserted into the coil hold groove 74b1 and held. Further, a top wall of the holder 74b contacts an inner wall of the cover 76 (a wall opposite to the base 74a of the coil hold member 74) to support around the intermediate portion between a peripheral edge and the center of the cover 76 (see FIG. 3). Therefore, the coil hold member 74 also works as the load support member between a bottom wall of the case (top wall of the bottom plate 71) and the inner wall of the cover 76.

The coil hold member 74 holds not a corner portion but a straight portion of the hexagonal feed-side resonance coil 31. This is because if the coil hold member 74 holds the corner portion, it becomes difficult to process the coil hold groove 74b1 formed in the holder 74b, and the processing cost may be increased. Therefore, according to this embodiment, because the coil hold groove 74b1 is formed straight for holding the straight portion of the coil, the process becomes easy, and the processing cost is prevented from being increased.

Figure 7:
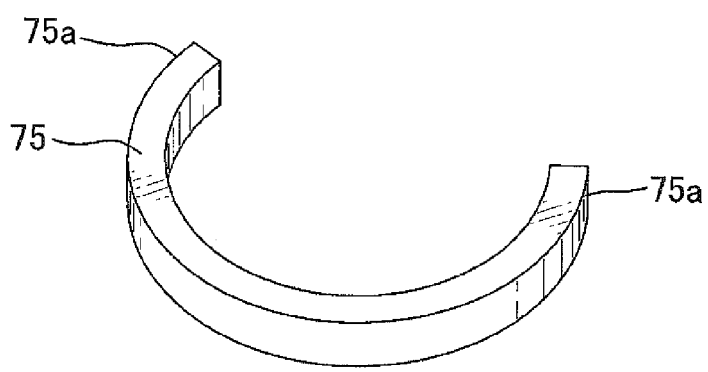
FIG. 7 is an enlarged perspective view showing a capacitor protective member of the shield case used in the contactless feed system according to the present invention.
Figure 8:
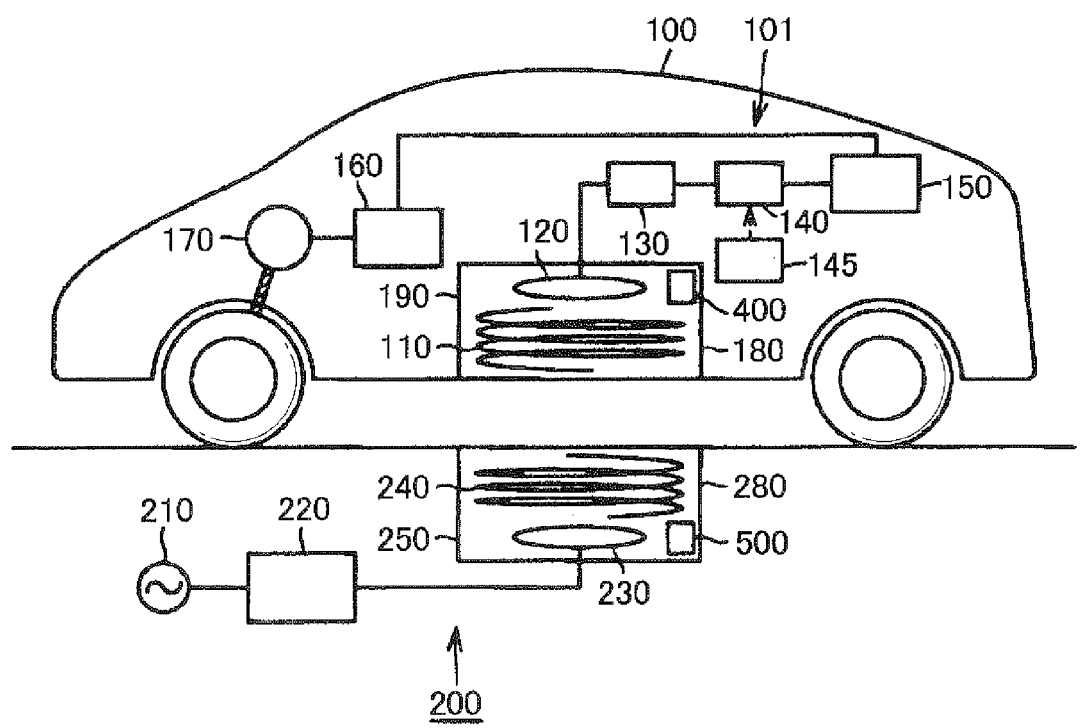
FIG. 8 is an entire constitution view of a conventional contactless feed system.
Figure 9:
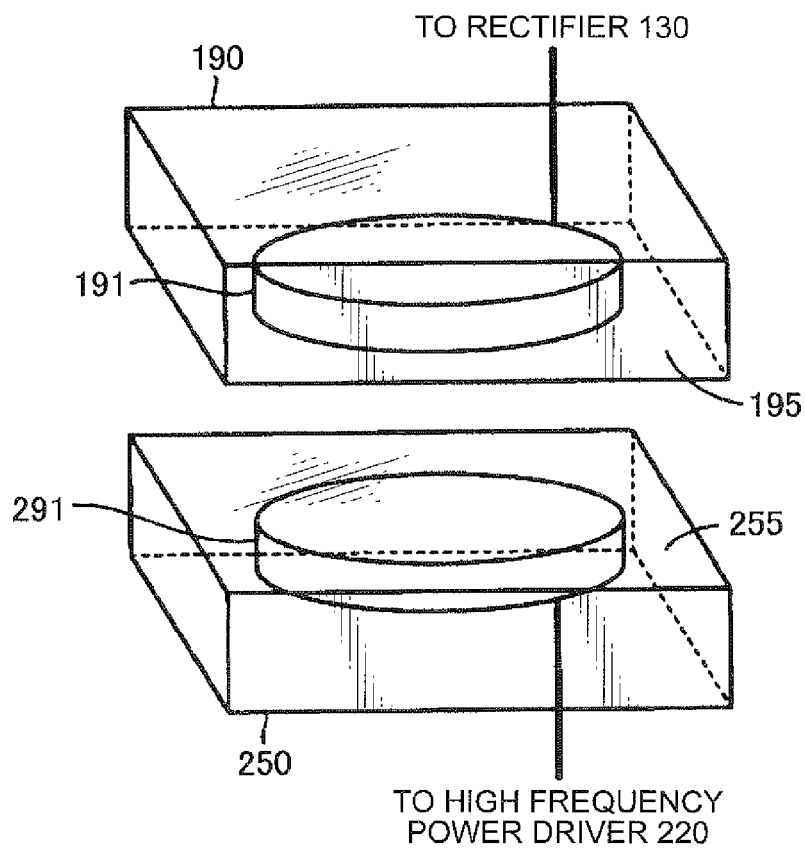
FIG. 9 is a schematic view showing a constitution of an electromagnetic shield case and a circumference thereof in the contactless feed system shown in FIG. 8.
Figure 10:
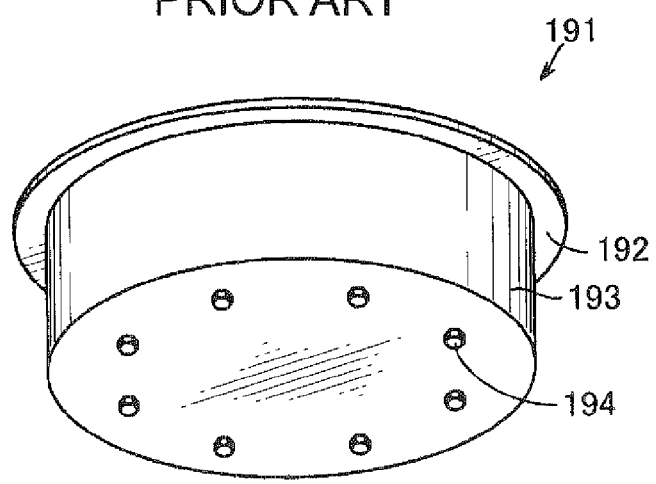
FIG. 10 is a perspective view showing a coil case of the contactless feed system shown in FIG. 8.
Figure 11:
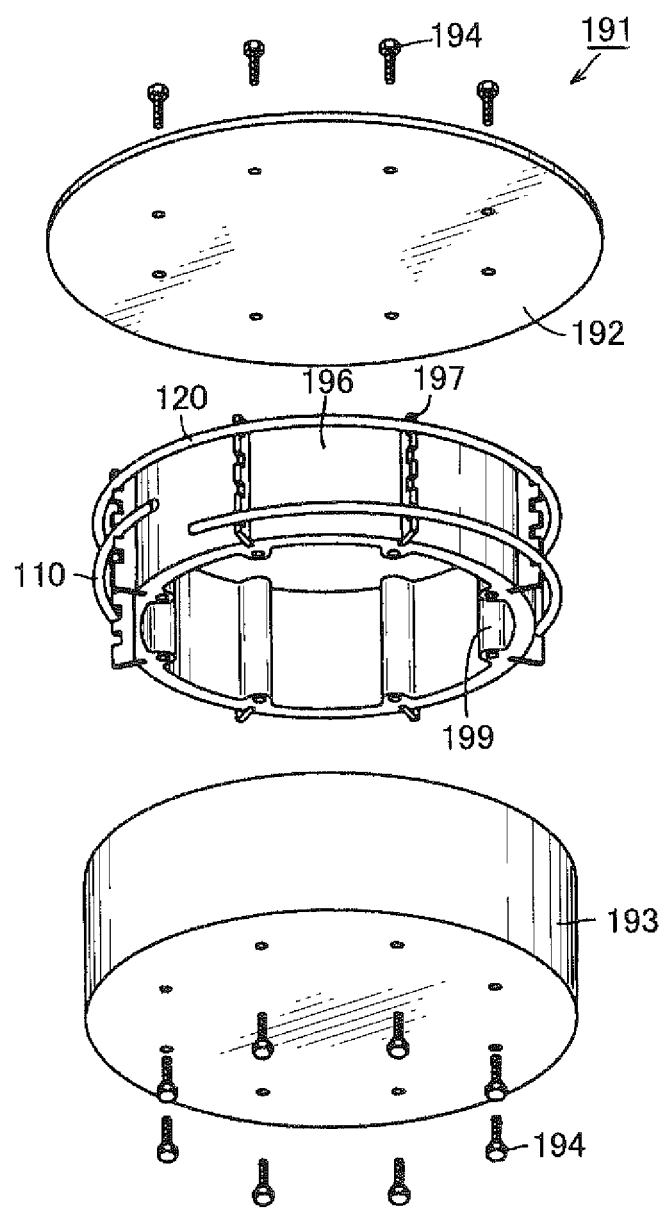
FIG. 11 is an exploded perspective view showing the coil case of FIG. 10.

FIG. 7 is an enlarged perspective view showing a capacitor protective member 75. The capacitor protective member 75 is composed of a protective member formed in a horseshoe shape (namely, U-shape). The capacitor protective member 75 has both ends 75a, and as shown in FIG. 4, the capacitor 1 is held between them. Owing to such an arrangement of the capacitor protective member 75, the capacitor C1 is protected, and a fear of an accident of breakage or the like is reduced.

A top wall of the capacitor protective member 75 contacts around the center of an inner wall of the cover 76 (see FIG.

3), and when a load is applied to the cover from an outside, the capacitor protective member 75 supports the cover 76 so as not to be deformed. Thereby, a fear that the capacitor C1 inside the shield case 70 is broken by a deformation of the cover is eliminated. Therefore, the capacitor protective member 75 also works as the load support member between a bottom wall of the case (top wall of the bottom plate 71) and the inner wall of the cover 76.

In this way, according to this embodiment, the shield member 72, the support member 73, the coil hold member 74, and the capacitor protective member 75 support the cover 76 so that the cover 76 is prevented from being deformed by the load from above the shield case 70 (above the cover 76). If only the shield member 72 and the support member 73 receive the load from above, and the coil hold member 74 and the capacitor protective member 75 do not support, when a large load is concentrated around the center of the cover 76, the cover 76 may be deformed and contact the components (coil and capacitor) inside the shield case 70, and in the worst case, they may be broken. Further, at this time, a gap between the cover 76 and the shield member 72 may be increased, and the waterproof performance may be reduced.

However, according to the present invention, the top wall of the base 74a of the coil hold member 74 which conventionally only supports the coil contacts the inner wall of the cover 76, and the coil hold member 74 also receives the load from above the cover 76. Further, the top wall of the capacitor protective member 75 for protecting the capacitor C1 contacts the inner wall of the cover 76, and the capacitor protective member 75 also receives the load from above the cover 76. Owing to such a configuration, the load bearing property can be improved without increasing a thickness of the cover 76 to increase the strength, and without increasing the total weight of the shield case 70 notably. Further, the deformation of the cover 76 is further prevented.

Further, when the thickness or the like of the cover 76 is increased for improving strength, the efficiency of power delivery may be reduced. However, in the shield case 70 of the present invention, because the thickness of the cover 76 is maintained while the strength and the load bearing property are improved, the efficient power delivery can be provided.

Further, the shield case 70 used as the feed portion 3 is slim without increasing the total weight notably, and the load bearing property is increased. Therefore, the shield case 70 can be used as "the floor placing type" which is not buried in but installed on a ground, and can be moved freely. In a case of the floor placing type, it is preferable that it can be used in any type of an electric vehicle, and the shield case 70 of the present invention can satisfy this demand. Further, the shield case 70 can also satisfy the strength not to be destroyed even when a vehicle moves over, the waterproof performance able to be used smoothly even when installed outdoor, and the weight allowing a human to carry. Incidentally, of course, the shield case 70 can also be used as "an embedded type" to be embedded underground.

As explained above, the shield case of the present invention allows efficient power delivery in the contactless feed system while ensuring environmental resistant such as strength and waterproof in spite of a thin type.

As shown above, the embodiment of the present invention is explained. However, the present invention is not limited to this. Various modifications and applications can be made. As long as provided with the configuration of the present invention, such modifications and applications are included in a scope of the present invention.

For example, in the above embodiment, the shield case 70 is used as the feed portion 3. However, the shield case 70 may be used as the receive portion 5.

Further, in the above embodiment, the coil is formed in a hexagonal shape. However, the shape is not limited to this, and may be any polygonal shape.

Further, in the above embodiment, the holder 74b of the coil hold member 74 is formed in a square-pole shape. However, the shape is not limited to this, and may be modified properly.

Further, in the above embodiment, the shape of the capacitor protective member 75 is the horseshoe shape. However, the shape is not limited to this, and may be modified properly.

Further, in the above embodiment, the present invention is practiced with a resonance type contactless feed system in which the shield case is composed of the coil and the capacitor. However, the present invention is not limited to this, and may be practiced with the other resonance system or an electromagnetic induction type contactless feed system.

When practicing with the electromagnetic induction type contactless feed system, because the capacitor C1 is unnecessary, the center space where the capacitor C1 is placed in FIG. 4 is open. Therefore, instead of the capacitor protective member 75, one or a plurality of hard-resin-made support poles (for example, circular pole) may be provided in this center space for only supporting the cover 76 as the load support member, and may support around the center of the cover 76.

REFERENCE SIGNS LIST

C1 capacitor
31 feed-side resonance coil (coil)
70 shield case
71 bottom plate
72 shield member
72a bottom wall
72b sidewall
72c top wall
73 support member
74 coil hold member
75 capacitor protective member
76 cover

The invention claimed is:
1. A shield case used in a feed-side device of a contactless feed system, said contactless feed system including:
the feed-side device installed in a fixed body;
a receive-side device installed in a mobile body and fed electric power from the feed-side device in a contactless manner,
said shield case comprising:
a case open toward the receive-side device;
a coil housed in an interior of the case; and
a cover covering an opening of the case,
wherein a load support member extending from a bottom surface of the case to an inner surface of the cover is provided inside the case, and
the case includes a bottom plate and a shield member formed in a ring shape and having a bottom wall, a sidewall extending vertically from a peripheral edge of the bottom surface portion, and a top wall folded inward in a radial direction from an upper end of the sidewall portion.
2. The shield case used in the contactless feed system as claimed in claim 1, further comprising:

a coil hold member for holding the coil in the shield case, wherein the coil hold member works as the load support member.

3. The shield case used in the contactless feed system as claimed in claim 2,
wherein the coil is formed in a polygonal shape, and
wherein the coil hold member includes a coil hold groove for supporting a straight portion of the polygonal shape of the coil.

4. The shield case used in the contactless feed system as claimed in claim 1, further comprising:
a capacitor connected to an end of the coil; and
a capacitor protective member arranged around the capacitor,
wherein the capacitor protective member works as the load support member.

5. The shield case used in the contactless feed system as claimed in claim 2, further comprising:
a capacitor connected to an end of the coil; and
a capacitor protective member arranged around the capacitor,
wherein the capacitor protective member works as the load support member.

6. The shield case used in the contactless feed system as claimed in claim 3, further comprising:
a capacitor connected to an end of the coil; and
a capacitor protective member arranged around the capacitor,
wherein the capacitor protective member works as the load support member.

7. The shield case used in the contactless feed system as claimed in claim 4,
wherein the capacitor protective member is formed in a horseshoe shape.

8. The shield case used in the contactless feed system as claimed in claim 5,
wherein the capacitor protective member is formed in a horseshoe shape.

9. The shield case used in the contactless feed system as claimed in claim 6,
wherein the capacitor protective member is formed in a horseshoe shape.

10. The shield case used in the contactless feed system as claimed in claim 1,
wherein the case includes a support member fitted into a concave portion of which three sides are surrounded by the bottom surface portion, the sidewall portion, and the top surface portion, and
wherein the shield member and the support member work as the load support member.

11. The shield case used in the contactless feed system as claimed in claim 10,
wherein the cover is fixed to the shield case by a screw penetrating the top surface portion and screwed with the support member.

12. A contactless feed system comprising:
a feed-side device installed in a fixed body;
a receive-side device installed in a mobile body and fed electric power from the feed-side device in a contactless manner,
wherein the shield case used in the contactless feed system as claimed in claim 1 is employed as the feed-side device.

* * * * *